(12) United States Patent
Liu

(10) Patent No.: US 8,392,412 B2
(45) Date of Patent: Mar. 5, 2013

(54) TECHNIQUE FOR CONFIRMATION OF DOMINANCY RELATIONSHIP

(75) Inventor: Yu Liu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/315,539

(22) Filed: Dec. 9, 2011

(65) Prior Publication Data

US 2012/0203774 A1 Aug. 9, 2012

(30) Foreign Application Priority Data

Feb. 7, 2011 (JP) ................................. 2011-024291

(51) Int. Cl.
*G06F 7/00* (2006.01)
(52) U.S. Cl. ........................................ 707/723; 707/748
(58) Field of Classification Search .................. 707/723, 707/748
See application file for complete search history.

(56) References Cited

U.S. PATENT DOCUMENTS

| | | | |
|---|---|---|---|
| 7,155,423 B1 * | 12/2006 | Josephson et al. .............. | 706/60 |
| 7,653,888 B2 | 1/2010 | Habib et al. | |
| 7,668,801 B1 * | 2/2010 | Koudas et al. ................ | 707/713 |
| 2007/0038620 A1 * | 2/2007 | Ka et al. ............................ | 707/5 |

FOREIGN PATENT DOCUMENTS

| | | |
|---|---|---|
| JP | 11-345752 A | 12/1999 |
| JP | 2009-135151 A | 6/2009 |
| JP | 2010-525610 A | 7/2010 |

OTHER PUBLICATIONS

Liu, Yu et al., "Generation of Yield-Embedded Pareto-Front for Simultaneous Optimization of Yield and Performances", Design Automation Conference (DAC), 2010 47th ACE/IEEE, Jun 13-18, 2010, pp. 909-912.
Sharma, Manish et al., "Efficiently Performing Yield Enhancements by Identifying Dominant Physical Root Cause from Test Fail Data", International Test Conference 2008, IEEE, Paper 14.3 Oct. 28-30, 2008, pp. 1-9.

* cited by examiner

*Primary Examiner* — Pierre Vital
*Assistant Examiner* — Courtney Harmon
(74) *Attorney, Agent, or Firm* — Fujitsu Patent Center

(57) ABSTRACT

A method includes: classifying sampling points (SPs) into ranks so as to satisfy a condition such as a condition that no SP belonging to a certain rank is dominated by another SP belonging to a rank higher than the certain rank; determining, in ascending order from a lowest rank, whether a first SP belonging to a first rank dominates a second SP belonging to a second rank higher than the first rank. When the first SP dominates, while changing the rank from a rank immediately lower than the first rank to the lowest rank, the first SP and SPs dominating the first SP and included in a first set of the first SP are added to a dominating source set of the second SP, and the first SP and SPs in the first set are excluded from SPs for which the determining is executed with respect to the second SP.

5 Claims, 10 Drawing Sheets

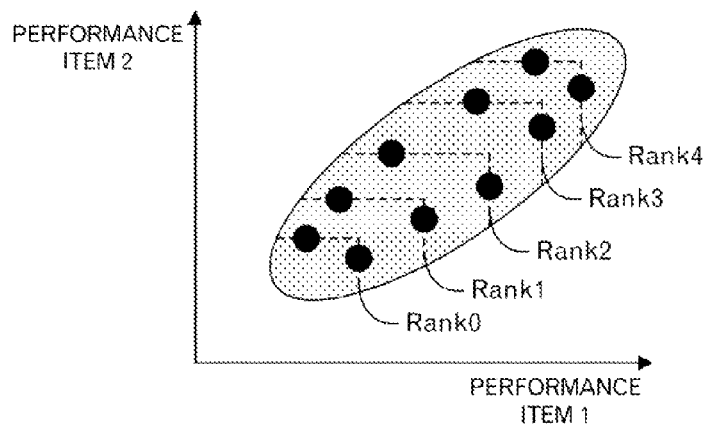
FIG.3
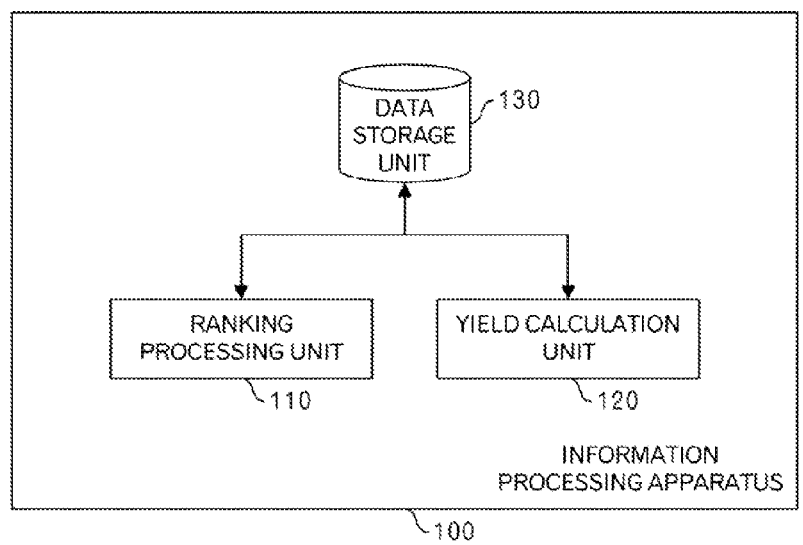
FIG.4
| SAMPLING POINT ID | PERFORMANCE ITEM 1 | PERFORMANCE ITEM 2 | PERFORMANCE ITEM 3 | ... | RANK | YIELD |
|---|---|---|---|---|---|---|
| 1 | A1 | B1 | C1 | | | |
| 2 | A2 | B2 | C2 | | | |
| 3 | A9 | B9 | C9 | | | |
| 4 | A10 | B10 | C10 | | | |
| ⋮ | ⋮ | ⋮ | ⋮ | | | |
FIG.5

| SAMPLING POINT ID | PERFORMANCE ITEM 1 | PERFORMANCE ITEM 2 | PERFORMANCE ITEM 3 | ... | RANK | YIELD |
|---|---|---|---|---|---|---|
| 1 | A1 | B1 | C1 | | 0 | |
| 2 | A2 | B2 | C2 | | 1 | |
| 3 | A9 | B9 | C9 | | 2 | |
| 4 | A10 | B10 | C10 | | 2 | |
| ⋮ | ⋮ | ⋮ | ⋮ | | ⋮ | |

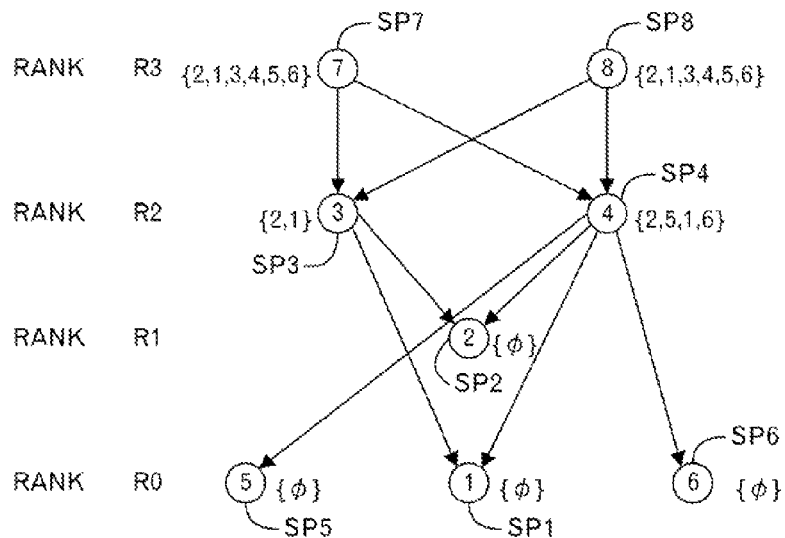
FIG.16
| SAMPLING POINT ID | PERFORMANCE ITEM 1 | PERFORMANCE ITEM 2 | PERFORMANCE ITEM 3 | ... | RANK | YIELD |
|---|---|---|---|---|---|---|
| 1 | A1 | B1 | C1 | | 0 | 0.125 |
| 2 | A2 | B2 | C2 | | 1 | 0.125 |
| 3 | A9 | B9 | C9 | | 2 | 0.375 |
| 4 | A10 | B10 | C10 | | 2 | 0.625 |
| ⋮ | ⋮ | ⋮ | ⋮ | ⋮ | ⋮ | ⋮ |
FIG.17
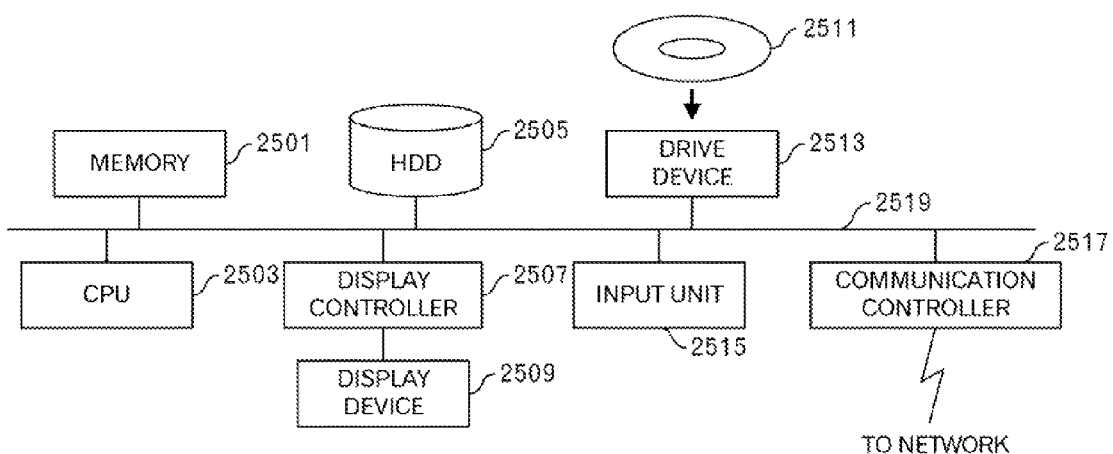
FIG.18

US 8,392,412 B2

TECHNIQUE FOR CONFIRMATION OF DOMINANCY RELATIONSHIP

CROSS-REFERENCE TO RELATED APPLICATIONS

This application is based upon and claims the benefit of priority of the prior Japanese Patent Application No. 2011-024291, filed on Feb. 7, 2011, the entire contents of which are incorporated herein by reference.

FIELD

The embodiments discussed herein are related to a technique for supporting an automatic design of circuits.

BACKGROUND

A technique for automatically designing analog circuits taking into consideration the yield is disclosed in "Generation of yield-embedded Pareto-front for simultaneous optimization of yield and performances", Design Automation Conference (DAC), 2010 47th ACE/IEEE, 13-18, Jun. 2010, pp. 909-912, which is written by an inventor of this application. This paper is incorporated herein by reference.

In this paper, plural sampling points having plural types of performance item values (also collectively called performance. For example, gain, consumption power, linearity, area, noise, accuracy, dynamic range, impedance matching or the like), which are simulation results for combinations of specific design parameter values and specific design variable values, are generated while changing the values in the aforementioned combinations, and the yield is defined for each of the plural sampling points as described below.

As a premise, "the performance P1 of the sampling point 1 dominates the performance P2 of the sampling point 2" is defined as follows:

$$P1 \Leftrightarrow P2 \prec \forall i(p_{1i} \leq p_{2i}) \wedge \exists i(p_{1i} \leq p_{2i}), i=1 \ldots N \quad (1)$$

Incidentally, $p_{1i}$ represents a value of an i-th performance item, which is included in the performance P1, and $p_{2i}$ represents a value of the i-th performance item, which is included in the performance P2. The expression (1) represents that it is said that the performance P1 dominates the performance P2 when the value of each of all performance items in the sampling point 1 are equal to or better than the value of the corresponding performance item in the sampling point 2 and the value of any one of the performance items in the sampling point 1 is better than the value of the corresponding performance item in the sampling point 2. When the performance P1 dominates the performance P2, it is also said that the sampling point 1 dominates the sampling point 2.

In addition, the dominancy relationship with respect to the performance will be explained by using FIG. 1. Here, it is assumed that there are two performance items, and a first performance item is set to a vertical axis as the performance item 1, and the lesser the value is, the higher the performance is. Moreover, it is also assumed that a second performance item is set to a horizontal axis as the performance item 2, and the lesser the value is, the higher the performance is. Here, when the simulation is carried out to identify the values of the performance items 1 and 2, points are plotted on the two-dimensional space as illustrated in FIG. 1. In an example of FIG. 1, 6 sampling points (also called "solution") A to F are obtained. In such a situation, because the lesser values are favorable, of course, the nearer to the origin the point is, the better the sampling point is.

Then, "X dominates Y" represents that all components (i.e. performance item value) of Y is equal to or worse than the corresponding components of X, and at least one of the components of Y is worse than the corresponding component of X. In the two-dimensional space as illustrated in FIG. 1, because B whose values of the performance items 1 and 2 are lesser is a better sampling point than E, "B dominates E", and similarly, because C is a better sampling point than F, "C dominates F". On the other hand, when A is compared with B, because the A's value of the performance item 2 is lesser but the B's value of the performance item 1 is lesser, it cannot be said that "A dominates B". As for A to D, the dominancy relationship is not satisfied. Thus, the sampling points that are not dominated by the other sampling point in the performance space are called "Pareto" (also called "non-dominant solution"). Then, a curve A (in case of the three-dimensional or higher dimensional space, curved surface) connecting the Pareto is called "Pareto curve" (or "Pareto curved surface").

In addition, as illustrated in FIG. 2, the sampling points are plotted at positions of circle marks according to their performance item values, a sampling point to be considered is marked by a dark circle. Incidentally, a hatched ellipse virtually represents a distribution area of the sampling points. In such a case, the sampling points having the value of each of the performance items, which is equal to or better than the value of the corresponding performance item of the sampling point to be considered are the sampling points included in a rectangular measurement range whose upper right point is the dark point. Incidentally, when the number of performance items is equal to or greater than "3", the condition of the measurement range is the same.

In the aforementioned paper, the appearance probability of the sampling points having the performance equal to or greater than the sampling point to be considered is defined as the yield. Therefore, the number of sampling points that appears in the measurement range illustrated in FIG. 2 +1 (which is the sampling point to be considered) is counted, and the yield is calculated by dividing the counted number by the number of all sampling points.

However, when the yield is calculated for each of the sampling points, a processing for confirming the dominancy relationship with all of the other sampling points is carried out for each sampling point to be considered, and it takes a long processing time, when the number of sampling points becomes greater.

Incidentally, also in case where a processing for simply confirming the dominancy relationship between the sampling points is carried out instead of a case of calculating the yield, the similar processing is required.

Namely, there is no technique for confirming the dominancy relationship between the sampling points at high speed.

SUMMARY

A method according to this technique includes: classifying a plurality of sampling points, each having plural types of performance item values, into a plurality of ranks, based on the performance item values, so as to satisfy a condition, wherein the condition includes a first condition that sampling points belonging to the same rank are not dominated each other, and a second condition that a sampling point belonging to a certain rank is not dominated by another sampling point belonging to a rank higher than the certain rank; determining, in ascending order from a lowest rank to a highest rank among the plurality of ranks, whether or not a first sampling point belonging to a first rank dominates a second sampling point belonging to a second rank higher than the first rank; and upon detecting the first sampling point dominates the second sampling point, carrying out a processing while changing the rank from a rank immediately lower than the first rank to the lowest rank, wherein the processing includes: adding the first sampling point and sampling points included in a first dominating source set of the first sampling point to a second dominating source set of the second sampling point, wherein the first dominating source set includes the sampling points dominating the first sampling point, and the second dominating source set includes sampling points dominating the second sampling point; and excluding the first sampling point and the sampling points included in the first dominating source set of the first sampling point from sampling points for which the determining is carried out with respect to the second sampling point.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram to explain an embodiment of this technique;

FIG. 4 is a functional block diagram of an information processing apparatus relating to the embodiment;

FIG. 5 is a diagram depicting an example of data in an initial state, which is stored in a data storage unit;

FIG. 16 is a diagram schematically illustrating the dominancy relationship;

FIG. 17 is a diagram depicting an example of data stored finally in the data storage unit; and FIG. 18 is a functional block diagram of a computer.

DESCRIPTION OF EMBODIMENTS

Figure 1:
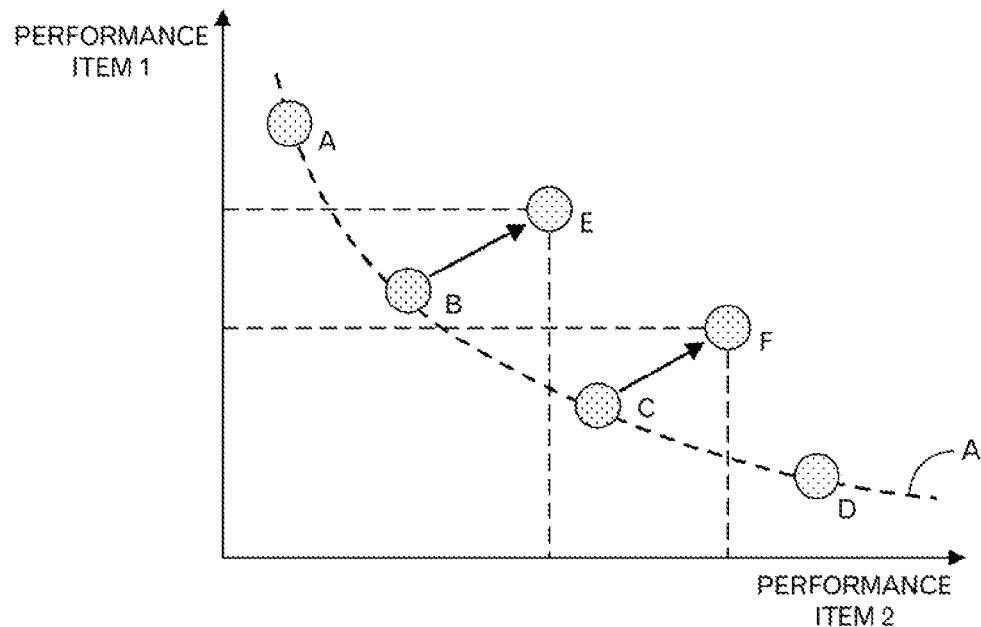
FIG. 1 is a diagram to explain a dominancy relationship of the performance.
Figure 2:
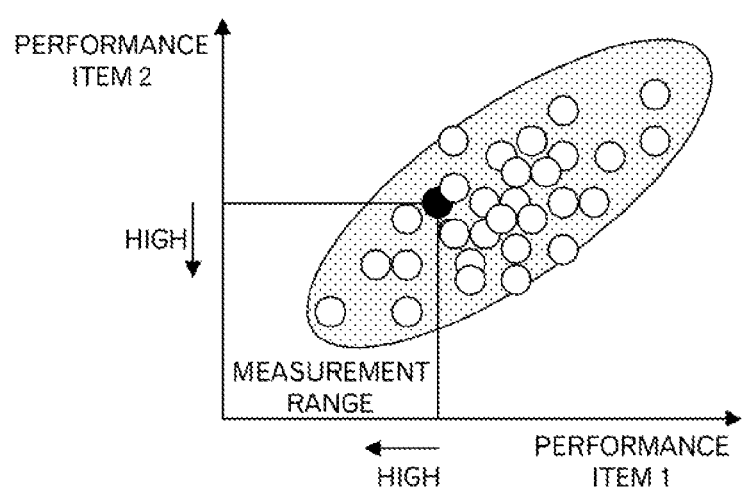
FIG. 2 is a diagram to explain the yield of the sampling points.

As illustrated in FIG. 3, it is assumed that, in a plane mapped by two performance items, the sampling points dispersively exist in the hatched area, and 10 sampling points including the sampling points A to D exist. In such a case, when the relationship "D dominates B" is identified, a processing for respectively confirming "D dominates A" and "B dominates A" is inefficient. In addition, as illustrated in FIG. 3, when a relation (the performance item value B1 of B<the performance item value C1 of C) AND (the performance item value B2 of B>the performance item value C2 of C) is held, there is no dominancy relationship between B and C. Thus, because there is no dominancy relationship when it is identified that only one performance item is better, it is wasteful to compare all performance item values between B and C, when it is identified that such a condition is held. Especially, because the performance distribution of the analog circuit is often a simple distribution such as Gaussian distribution or exponential distribution, a case frequently occurs that the other comparison is wasteful.

Then, in this embodiment, as illustrated in FIG. 3, the sampling points are grouped (or ranked) in advance so as to clarify the dominancy relationship.

More specifically, the nearer to the Pareto curve (or curved surface) the sample point is, the lower rank is set, and the sampling point belonging to a higher rank does not dominate the sampling point belonging to the lower rank, and there is no dominancy relationship between the sampling points belonging to the same rank.

In an example of FIG. 3, each of the sampling points on a line of rank 0 is not dominated by the other sampling points, and the sampling points on the line of rank 0 do not dominate each other. In addition, the sampling point on the line of rank 1 may be dominated by any one of the sampling points belonging to rank 0 (it is dominated in case of FIG. 3), but is not dominated by the other sampling points belonging to rank 2 and subsequent ranks. In addition, the sampling points on the line of rank 1 do not dominate each other. Furthermore, the sampling points on a line of rank 2 may be dominated by any one of the sampling points belonging to rank 0 or 1 (it is dominated in case of FIG. 3), but is not dominated by the other sampling point belonging to rank 3 and subsequent ranks. In addition, the sampling points on the line of rank 2 do not dominate each other. The same matters are applied to subsequent ranks.

When such ranking is carried out, the processing efficiency is improved, because it is only necessary to confirm the dominancy relationship with the sampling points belonging to the lower rank. In addition, as described above, a sampling point that is dominated by a sampling point dominated by a certain sampling point is apparently dominated by the certain sampling point. Therefore, by picking up the sampling point in ascending order of the rank and picking up the sampling point that is a dominating source, which is sampling point dominating the sample point to be considered, from the sampling points belonging to a rank immediately before, while maintaining dominating sources for each sampling point, it is possible to grasp the dominating sources, efficiently. When the dominating sources are grasped, the yield can be calculated at high speed.

Next, FIG. 4 illustrates a functional block diagram of an information processing apparatus for confirming the dominancy relationship described above. As illustrated in FIG. 4, the information processing apparatus 100 has a ranking processing unit 110, yield calculation unit 120 and data storage unit 130. The ranking processing unit 110 carries out a processing using data stored in the data storage unit 130, and stores processing results into the data storage unit 130. The yield calculation unit 120 carries out a processing using data stored in the data storage unit 130, and stores processing results into the data storage unit 130.

The data storage unit 130 initially stores data as illustrated in FIG. 5, for example. In an example of FIG. 5, a table includes an identifier (ID) of the sampling point, values of the performance items 1 to M, rank and yield. However, the rank and yield has not been registered, yet. In addition to the aforementioned data, the pertinent circuit configuration, design variable values and design parameter values may be registered for each sampling point. However, because such data does not directly relate to this embodiment, such data is omitted.

Figure 6:
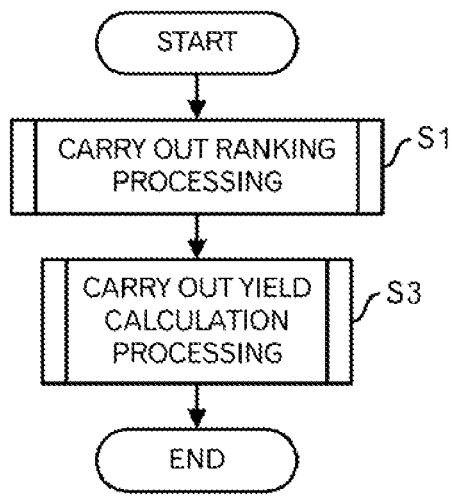
FIG. 6 is a diagram depicting a main processing flow.

Next, processing contents of the information processing apparatus 100 illustrated in FIG. 4 will be explained by using FIGS. 6 to 17. First, the ranking processing unit 110 carries out a ranking processing by using the data stored in the data storage unit 130, and stores the processing results into the data storage unit 130 (FIG. 6: step S1). The ranking processing will be explained by using FIGS. 7A to 10. After this, the yield calculation unit 120 carries out a yield calculation processing by using the data stored in the data storage unit 130, and stores the processing result into the data storage unit 130 (step S3). The yield calculation processing will be explained by using FIGS. 11 to 17.

Figure 8:
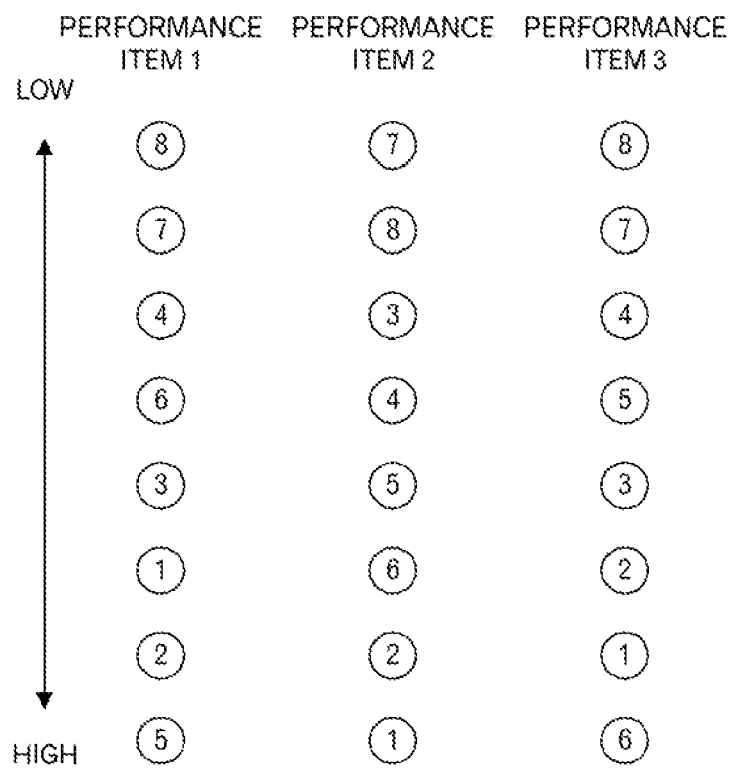
FIG. 8 is a diagram to explain a sorting processing.
Figure 7A:
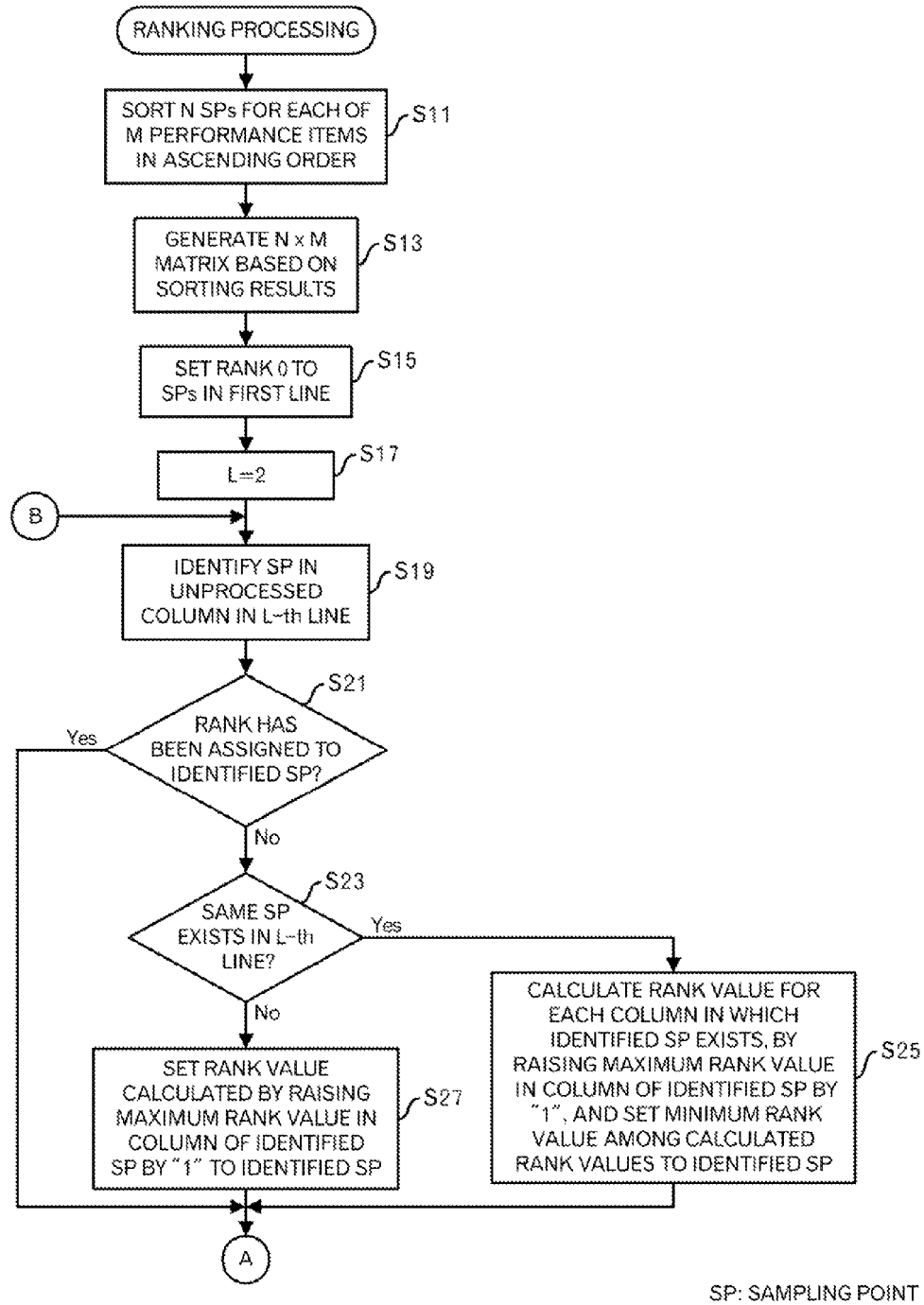
FIG. 7A is a diagram depicting a processing flow of a ranking processing.

Next, the ranking processing will be explained by using FIGS. 7A to 10. The ranking processing unit 110 sorts N sampling points SPs, which are stored in the data storage unit 130, for each of M performance items, in ascending order of the values (FIG. 7A: step S11). For example, an example in case of N=8 and M=3 is considered. As illustrated in FIG. 8 (the number in the circle represents an identifier of the sampling point.), the sampling points 1 to 8 are sorted with respect to the performance item 1, the sampling points are sorted with respect to the performance item 2, and the sampling points are sorted with respect to the performance item 3. The performance item value of the sampling point is different for each performance item. Therefore, the order itself is different for each performance item. Incidentally, the sorting is carried out in ascending order of the values in the premise that the lesser the value is, the better the sampling point is. The sorting results are stored in a storage device such as a main memory.

Next, the ranking processing unit 110 generates an N×M matrix based on the sorting result (step S13). For each performance item, the identifier of the sampling point is registered into a corresponding element of the N×M matrix.

After that, the ranking processing unit 110 sets rank 0 to the sampling point SP on a first line (step S15). In the example of FIG. 8, rank 0 (R0) is set to the sampling points SP5, SP1 and SP6.

Next, the ranking processing unit 110 sets the line number L=2 (step S17), and identifies a sampling point SP in an unprocessed column and in the L-th line (step S19). For example, a sampling point SP2 in the unprocessed column (i.e. performance item 1) and in the second line is identified.

Then, the ranking processing unit 110 determines whether or not any rank has been assigned to the identified sampling point SP (step S21). In case of the sampling point SP2 in the column of the performance item 1 and in the second line, no rank is assigned. When the rank has been assigned, the processing shifts to a processing of FIG. 7B through a terminal A. On the other hand, when the rank is not assigned, the ranking processing unit 110 determines whether or not the same sampling point SP exists in the L-th line (step S23). In case of the sampling point SP2 in the column of the performance item 1 and in the second line, the sampling point SP 2 exists in the column of the performance item 2. Therefore, the sampling point SP also exists in the L-th line. When the same sampling point SP does not exist in the L-th line, the ranking processing unit 110 sets a value of the maximum rank in the column of the identified sampling point SP+1 as a rank value of the identified sampling point SP (step S27). Then, the processing shifts to the processing of FIG. 7B through the terminal A.

On the other hand, when there is the same sampling point SP in the L-th line, the ranking processing unit 110 calculates the maximum rank value in the column of the identified sampling point SP+1 for each column that the identified sampling point SP exists, and sets the minimum rank value among the calculated values to the identified sampling point SP (step S25). Then, the processing shifts to the processing of FIG. 7B through the terminal A.

In case of the sampling point SP2 in the column of the performance item 1 and in the second line, rank 1 is obtained by heightening the rank from 0 to 1, because rank 0 is assigned to the first line. In addition, in case of the sampling point SP2 in the column of the performance item 2 and in the second line, rank 1 is obtained by heightening the rank from 0 to 1, because rank 0 is assigned to the first line. Because rank 1 is obtained to both of them, the rank 1 is set to the sampling point SP2.

Figure 7B:
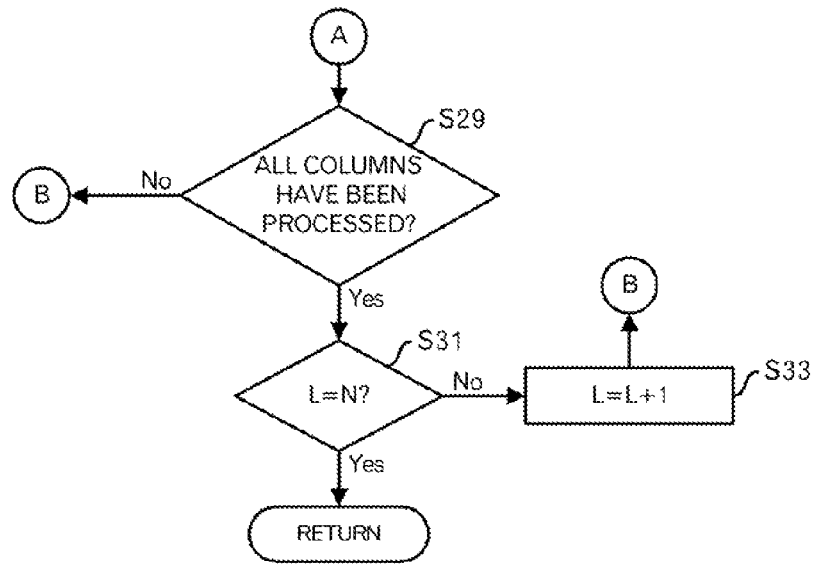
FIG. 7B is a diagram depicting a processing flow of the ranking processing.

Shifting to the explanation of the processing of FIG. 7B, the ranking processing unit 110 determines whether or not all columns in the L-th line have been processed (step S29). When there is an unprocessed column in the L-th line, the processing returns to the step S19 in FIG. 7A through the terminal B. On the other hand, when all of the columns in the L-th line has been processed, the ranking processing unit 110 determines whether or not L reaches N (step S31). When L does not reach N, the ranking processing unit 110 increments L by 1 (step S33), and the processing returns to the step S19 of FIG. 7A through the terminal B. On the other hand, when L reaches N, the processing returns to the calling-source processing.

Figure 9:
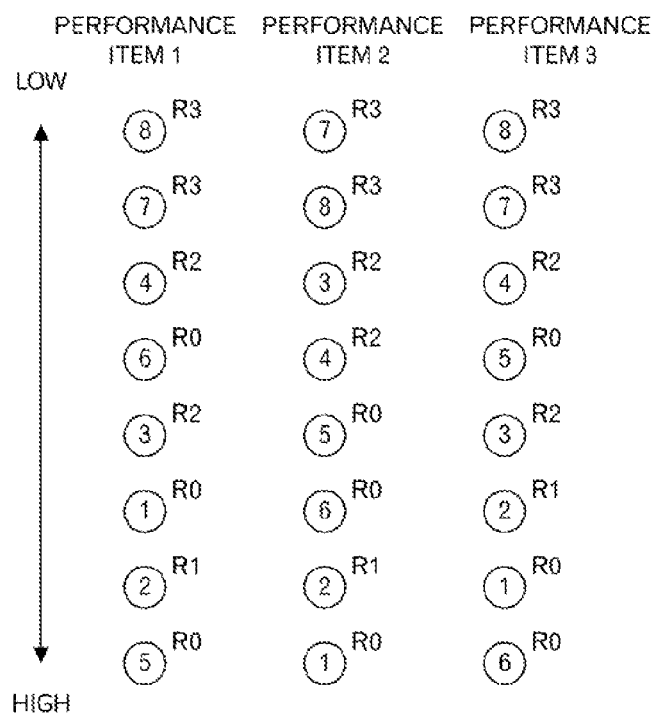
FIG. 9 is a diagram depicting an example of the ranking processing result.

When the sorting result as illustrated in FIG. 8 is obtained, the ranking as illustrated in FIG. 9 is obtained. Specifically, as described above, rank 0 is assigned to the sampling points SP5, SP1 and SP6 in the line L=1. Next, as described above, rank 1 is set to the sampling point SP2 in the line L=2. The rank has been set to the sampling point SP1 in the line L=2. Therefore, the processing is skipped. Furthermore, because the rank has been set to the sampling point SP1, SP6 and SP2 in the line L=3, the processing is skipped. When the sampling point SP3 in the line L=4, it is confirmed whether or not other sampling points SP3 exist in the same line. In this case, the sampling point SP3 appears twice, however, because rank 2, which is calculated by raising the current maximum rank value "1" by "1", is obtained for each column, rank 2 is set to the sampling point SP3 as it is. As for the sampling point SP5 in the line L=4, the rank has been set. Therefore, the processing is skipped.

Because the rank has been set to the sampling points SP6 and SP5 in the line L=5, the processing is skipped. When the sampling point SP4 in the line L=5, it is confirmed whether or not the other sampling points SP4 appear in the same line. In this case, because the other sampling points SP4 do not appear in the same line, rank 2, which is calculated by raising the maximum rank value "1" of the column by "1" at the step S27, is set to the sampling point SP4. Because the rank has been set to the sampling points SP4 and SP3 in the line L=6, the processing is skipped. When the sampling point SP7 in the line L=7 is processed, it is confirmed whether or not the other sampling points SP7 appear in the same line. In this case, the sampling point SP7 appears in the same line twice. However, rank 3, which is calculated by raising the current maximum rank value "2" by "1", is set to the sampling points in any column. Therefore, rank 3 is set to the sampling point SP7 as it is. When the sampling point SP8 in the line L=7 is processed, it is confirmed whether or not the other sampling points SP8 appear in the same line. In this case, because the other sampling points SP8 do not appear in the same line, rank 3, which is calculated by raising the maximum rank value "2" of the column by "1" at the step S27, is set to the sampling point SP8. Because the rank has been set to the sampling points SP8 and SP7 in the line L=8, the processing is skipped.

Thus, the rank is assigned to the sampling points in ascending order of the performance item values and according to the ranking of the performance item ranked highest among all of the performance items (i.e. the least value of L).

Figures 10, 11:
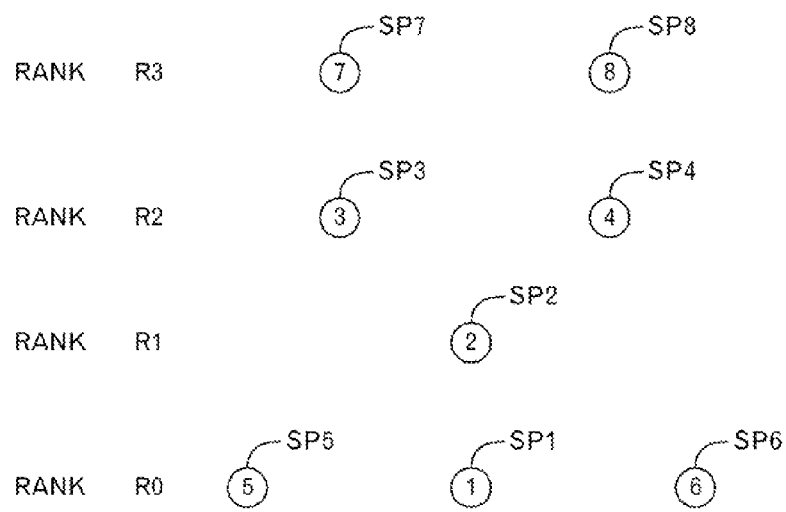
FIG. 10 is a diagram illustrating an example of data stored in the data storage unit, and for which the processing results of the ranking processing is reflected.
FIG. 11 is a diagram illustrating the sampling points belonging to each rank.

The value of the rank, which was set as described above, is stored in the data storage unit 130. For example, as illustrated in FIG. 10, the identified rank value is registered in the column of the rank, for which no value is registered in FIG. 5.

Next, the yield calculation processing will be explained by using FIGS. 11 to 17. When the processing results illustrated in FIG. 9 are schematically represented, the ranking of the sampling points are obtained as illustrated in FIG. 11. Namely, the sampling points SP5, SP1 and SP6 belong to rank 0, the sampling points SP2 belongs to rank 1, the sampling points SP3 and SP4 belong to rank 2, and the sampling points SP7 and SP8 belong to rank 3. Assuming such a state, the specific processing contents will be explained in the following.

Figure 12:
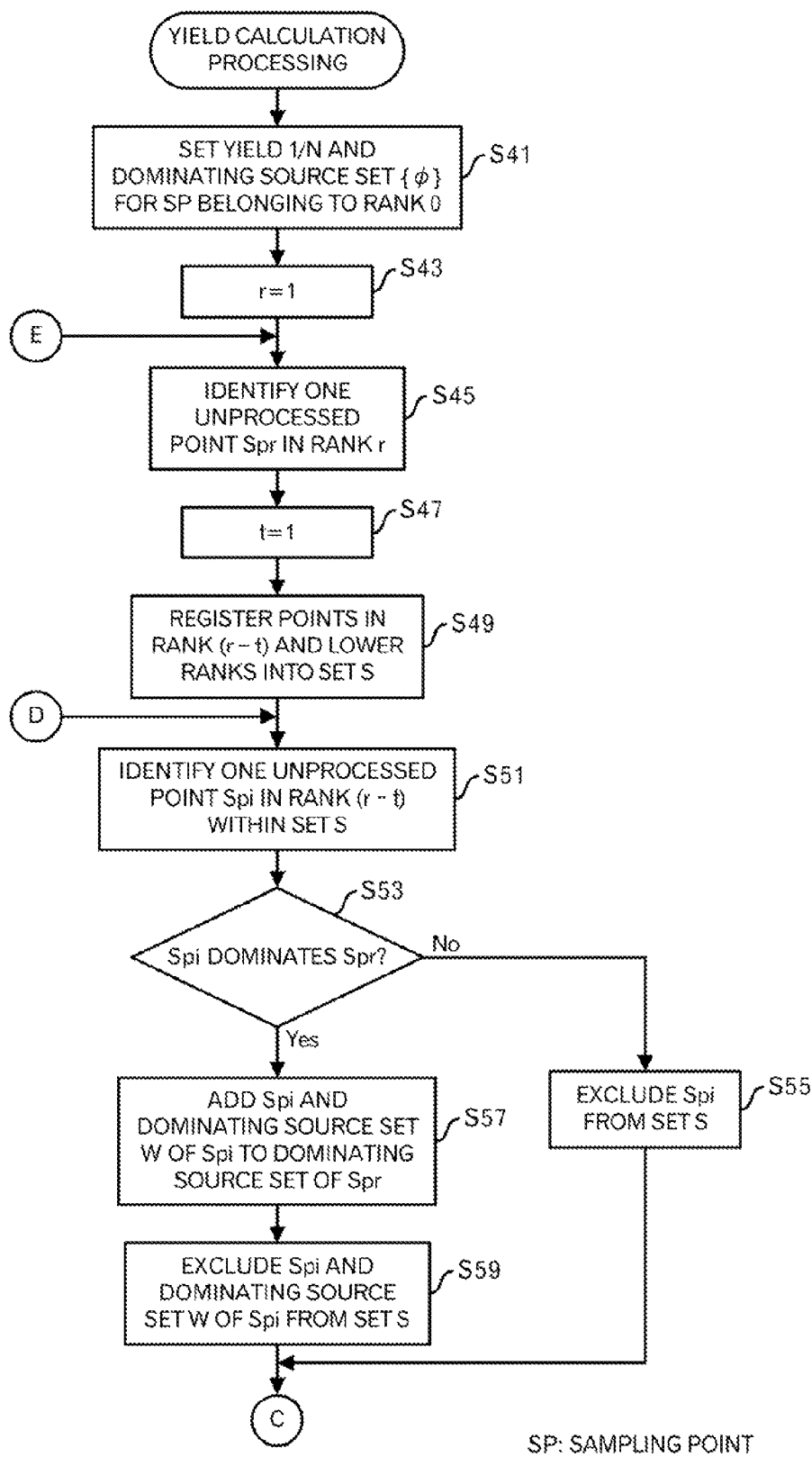
FIG. 12 is a diagram illustrating a processing of a yield calculation processing.

First, as for the sampling points SP belonging to rank 0, the yield calculation unit 120 sets 1/N to the yield and $\{\phi\}$ to a group of the dominating sources (FIG. 12: step S41). Then, the yield calculation unit 120 sets "1" to a counter r for the rank of the confirmation source with respect to the dominance relationship (step S43). In addition, the yield calculation unit 120 identifies one unprocessed sampling point Spr in rank r (step S45). Furthermore, the yield calculation unit 120 sets "1" to a counter t for the rank of the confirmation destination with respect to the dominancy relationship (step S47).

After that, the yield calculation unit 120 registers the sampling points SP belonging to the rank (r−t) and lower ranks to a set S of the sampling points for which the dominancy relationship has to be confirmed (step S49). For example, when the sampling point SP2 is set to Spr and r=1, the sampling points SP5, SP1 and SP6 in rank 0 (=1−1) are registered to the set S. In addition, when the sampling point SP3 is set to Spr and r=2, the sampling point SP2 in rank 1 (=2−1) and sampling points SP5, SP1 and SP6 in rank 0 are registered into the set S.

After that, the yield calculation unit 120 identifies one unprocessed sampling point Spi in the rank (r−t) in the set S (step S51). Then, the yield calculation unit 120 determines whether or not the sampling point Spi dominates the sampling point Spr (step S53). Here, it is determined whether or not the relationship follows the expression (1). When the sampling point Spi does not dominate the sampling point Spr, the yield calculation unit 120 excludes the sampling point Spi from the set S (step S55). Then, the processing shifts to a processing of FIG. 13 through a terminal C.

When the sampling point SP2 is Spr, no sampling points registered in the set S dominates the sampling point SP2 according to the sorting results as illustrated in FIGS. 8 and 10.

On the other hand, when the sampling point SP3 is Spr and t=1 and the sampling point SP2 is Spi, "SP2 dominates SP3" is held. In addition, in case of t=2, when the sampling point SP1 is Spi, "SP1 dominates SP3" is held. Incidentally, as for the sampling points SP5 and SP6, no dominancy relationship is held.

On the other hand, when the sampling point Spi dominates the sampling point Spr, the yield calculation unit 120 adds the sampling point Spi and a dominating source set W of the sampling point Spi to the dominating source set of the sampling point Spr (step S57). When the sampling point SP3 is Spr, "SP2 dominates SP3" is held as described above. Therefore, the sampling point SP2 is added to the dominating source set of the sampling point SP3. However, because the sampling point SP2 is not dominated by any other sampling points, the dominating source set of the sampling point SP2 is vacant $\{\phi\}$, and only SP2 is added to the dominating source set of the sampling point SP3 at this stage.

Furthermore, the yield calculation unit 120 excludes the sampling point Spi and the dominating source set W of the sampling point Spi from the set S of the sampling points for which the dominancy relationship has to be confirmed (step S59). By doing so, the number of sampling points for which the dominancy relationship has to be confirmed is reduced by inheriting the dominating sources. The processing shifts to the processing of FIG. 13 through the terminal C.

Figure 13:
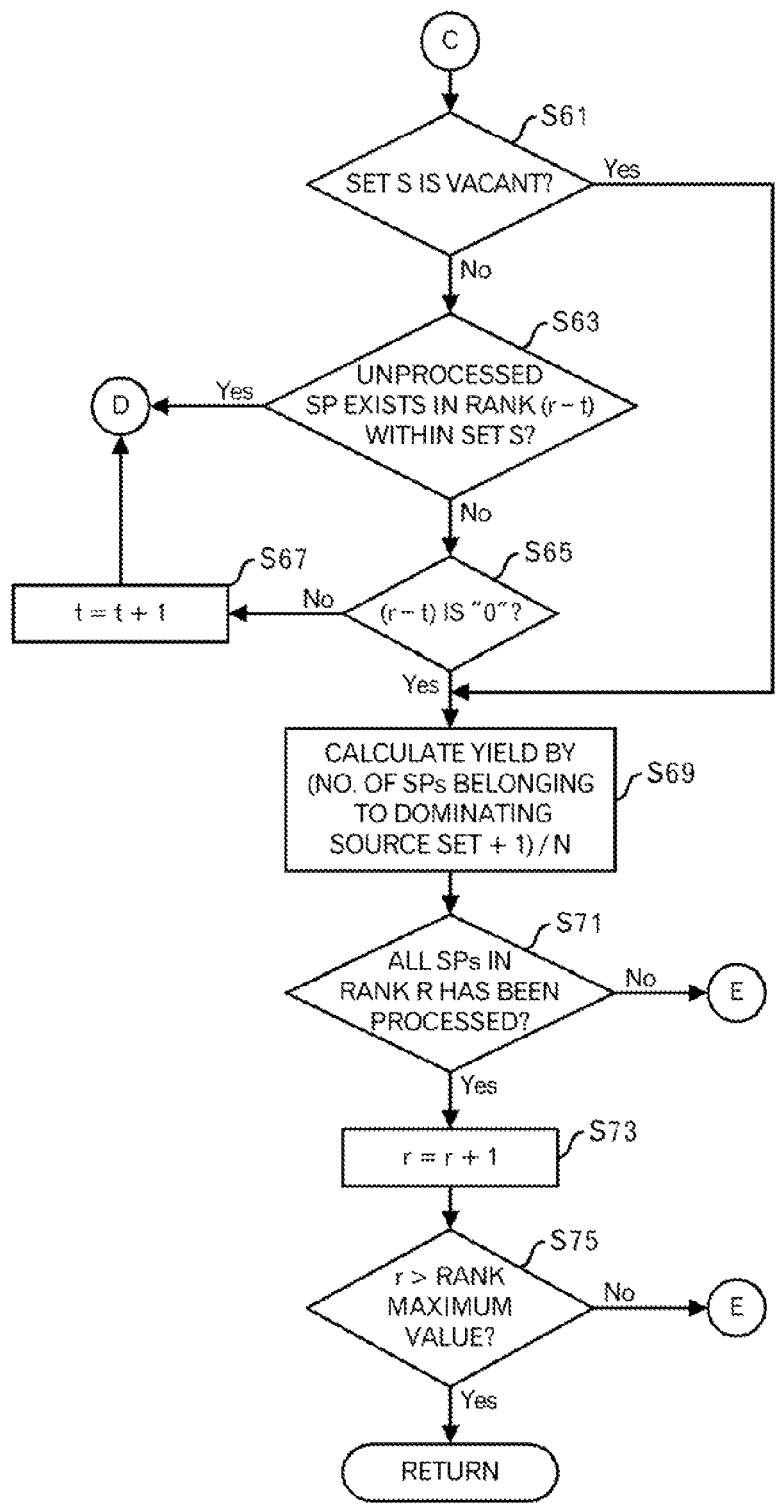
FIG. 13 is a diagram depicting a processing flow of the yield calculation processing.

Shifting to the explanation of the processing of FIG. 13, the yield calculation unit 120 determines whether or not the set S becomes vacant (step S61). When the set S becomes vacant, the processing shifts to the step S69.

On the other hand, when the set is not vacant, the yield calculation unit 120 determines whether or not there is an unprocessed sampling point in the rank (r−t) within the set S (step S63). When there is an unprocessed sampling point in the rank (r−t) within the set S, the processing returns to the step S51 of FIG. 12 through a terminal D. On the other hand, when there is not an unprocessed sampling point in the rank (r−t) within the set S, the yield calculation unit 120 determines whether or not (r−t) is 0 (step S65). When (r−t) is not 0, namely, the rank the confirmation destination with respect to the dominancy relationship does not reach the lowest rank, the yield calculation unit 120 increments t by 1 (step S67), and the processing returns to the step S51 of FIG. 12 through the terminal D.

When the sampling point SP3 is Spr, SP2 is added to the dominating source set at t=1, and SP1 is added to the dominating source set at t=2. Because the dominating source sets W for the sampling points SP2 and SP1 are vacant $\{\phi\}$, any other sampling points are not added.

When (r−t) reaches 0, or the set S becomes vacant, the yield calculation unit 120 calculates the yield by (the number of sampling points belonging to the dominating source set of the sampling point Spr+1)/N, and stores the yield into the data storage unit 130 (step S69). In case of the sampling point SP2, the dominating source set is vacant M. Therefore, the yield is ⅛. On the other hand, in case of the sampling point SP3, the dominating source set includes $\{1, 2\}$. Therefore, the yield is ⅜.

Then, the yield calculation unit 120 determines whether or not all of the sampling points in the rank r have been processed (step S71). When there is an unprocessed sampling point in the rank r, the processing returns to the step S45 through the terminal E.

On the other hand, when there is no unprocessed sampling point in the rank r, the yield calculation unit 120 increments the rank r by 1 (step S73), and determines whether or not r exceeds the maximum number (step S75). When r does not exceed the maximum number, the processing returns to the step S45 through the terminal E. On the other hand, when r exceeds the maximum number, the processing returns to the calling-source processing.

Figure 14:
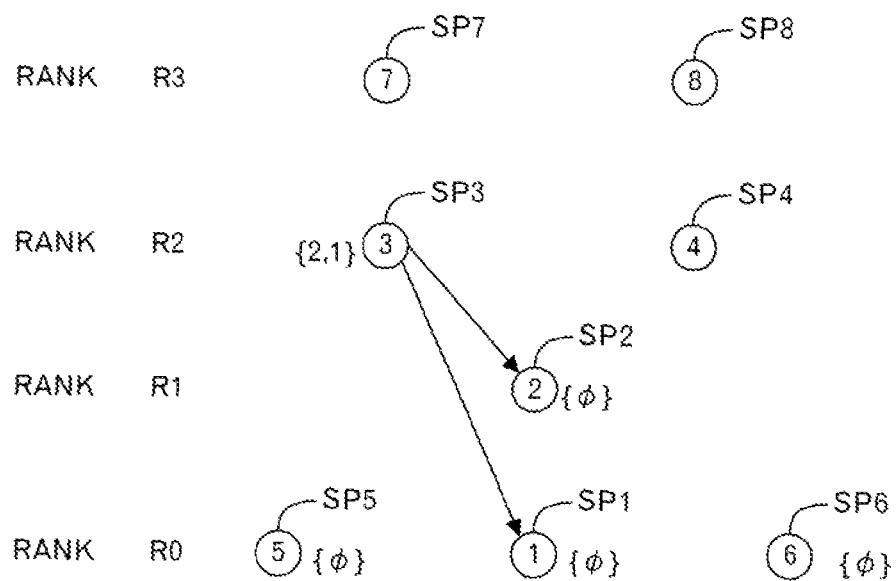
FIG. 14 is a diagram schematically illustrating the dominancy relationship.

The processing results up to the aforementioned sampling point SP3 are schematically depicted in FIG. 14. The dominating source set for the sampling points SP5, SP1 and SP6 belonging to rank 0 is vacant $\{\phi\}$, the dominating source set for the sampling point SP2 belonging to rank 1 is vacant $\{\phi\}$. On the other hand, as for the sampling point SP3 belonging to rank 2, because it is dominated by the sampling points SP2 and SP1 (the apex of the arrow represents the dominating source), the dominating source set includes $\{2, 1\}$.

Figure 15:
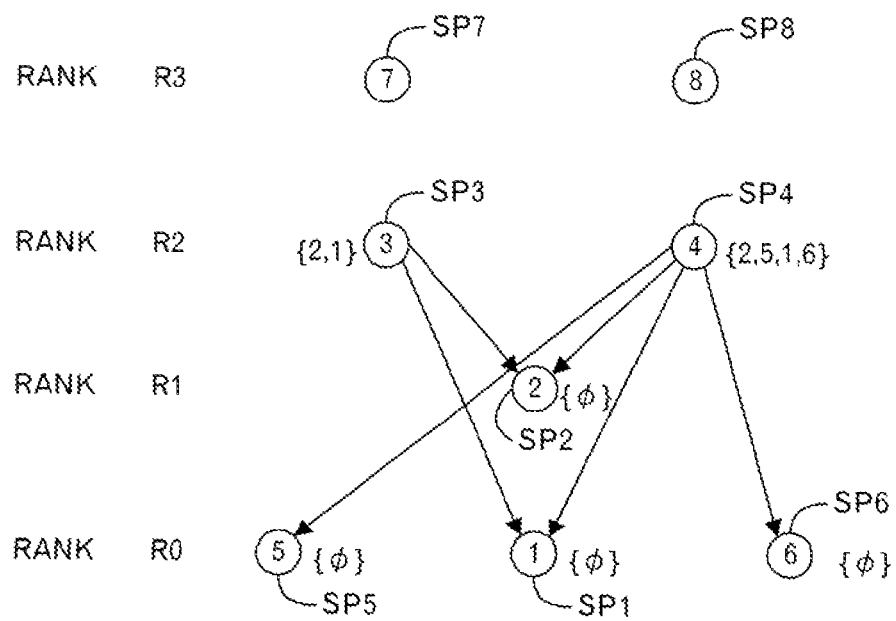
FIG. 15 is a diagram schematically illustrating the dominancy relationship.

Moreover, when the sampling point SP4 is Spr, it is grasped, according to FIGS. 8 and 10, that the sampling point SP4 is dominated by the sampling point SP2 in rank 1 and the sampling points SP5, SP1 and SP6 in rank 0. Therefore, as illustrated in FIG. 15, the dominating source set includes $\{2, 5, 1, 6\}$.

Furthermore, when the sampling point SP7 in rank 3 is Spr, first, the dominancy relationship is confirmed for the sampling point SP3 in rank 2. According to FIGS. 8 and 10, "SP3 dominates SP7" is held. Therefore, the sampling point SP3 and the dominating source set W $\{2, 1\}$ of the sampling point SP3 are added to the dominating source set of the sampling point SP7. Next, the dominancy relationship is confirmed for the sampling point SP4 in rank 2. According to FIGS. 8 and 10, "SP4 dominates SP7" is held. Therefore, the sampling point SP4 and the dominating source set W $\{2, 5, 1, 6\}$ of the sampling point SP4 are added to the dominating source set of the sampling point SP7. When there is a redundant sampling point, it is not additionally registered. Thus, the dominating source set of the sampling point SP7 becomes $\{2, 1, 3, 4, 5, 6\}$. Because the confirmation of the dominancy relationship for the sampling points included in the dominating source set can be omitted, the set S of the sampling point SP7 becomes vacant. Therefore, the number of the sampling points for which the dominancy relationship has to be confirmed is reduced. The similar processing is carried out for the sampling point SP8 in rank 3. As a result, data representing the dominancy relationship is obtained as illustrated in FIG. 16. The data representing the dominancy relationship is also stored in the data storage unit 130.

Incidentally, the yield of the sampling point SP4 is ⅝, and the yield of the sampling points SP7 and SP8 is ⅞.

Therefore, when the processing of FIGS. 12 and 13, the yields are registered in the column of the yield in the data storage unit 130 as illustrated in FIG. 17.

As described above, by appropriately carrying out the ranking and confirming the dominancy relationship in appropriate order, the number of sampling points for which the dominancy relationship has to be confirmed can be reduced considerably. Therefore, the efficiency of the processing is improved.

Although one embodiment of this technique was explained above, this technique is not limited to this embodiment. For example, the functional block diagram illustrated in FIG. 4 is a mere example, and it does not always correspond to an actual program module configuration. As for the processing flow, as long as the same processing results can be obtained, the processing flow can be modified. For example, the order of the steps may be exchanged and the plural steps may be executed in parallel.

As described above, only data representing the dominancy relationship may be obtained without calculating the yield.

In addition, the information processing apparatus 100 is a computer device as shown in FIG. 18. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 18. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiment is summarized as follows:

A method relating to this embodiment includes: classifying a plurality of sampling points, each having plural types of performance item values, into a plurality of ranks, based on the performance item values, so as to satisfy a condition, wherein the condition includes a first condition that sampling points belonging to the same rank are not dominated each other, and a second condition that a sampling point belonging to a certain rank is not dominated by another sampling point belonging to a rank higher than the certain rank; determining, in ascending order from a lowest rank to a highest rank among the plurality of ranks, whether or not a first sampling point belonging to a first rank dominates a second sampling point belonging to a second rank higher than the first rank; and upon detecting the first sampling point dominates the second sampling point, carrying out a processing while changing the rank from a rank immediately lower than the first rank to the lowest rank, wherein the processing includes: adding the first sampling point and sampling points included in a first dominating source set of the first sampling point to a second dominating source set of the second sampling point, wherein the first dominating source set includes the sampling points dominating the first sampling point, and the second dominating source set includes sampling points dominating the second sampling point; and excluding the first sampling point and the sampling points included in the first dominating source set of the first sampling point from sampling points for which the determining is carried out with respect to the second sampling point.

Thus, because it is only necessary to confirm the dominancy relationship with the sampling points belonging to a lower rank and the dominating sources of the sampling point dominating the sampling point to be considered is inherited, the number of sampling points for which the dominancy relationship has to be confirmed is reduced, and the processing efficiency becomes high.

In addition, the aforementioned method may further include: calculating, for each of the plurality of sampling points, a yield by dividing a value calculated by adding 1 and the number of sampling points included in a dominating source set of the sampling point to be considered, by the number of the plurality of sampling points. The yield can be calculated at high speed.

Furthermore, the classifying may include: sorting, for each of the plural types, the plurality of sampling points in ascending order of the performance item value; and assigning a rank to each of the plurality of sampling points according to a highest ranking among rankings set in the sorting to the plural types of the performance item values of the sampling point to be considered. By doing so, because it is only necessary to confirm the dominancy relationship with the sampling points belonging to the lower rank, the processing efficiency is improved.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a procedure, the procedure comprising:
    classifying a plurality of sampling points, each having plural types of performance item values, into a plurality of ranks, based on the performance item values, so as to satisfy a condition, wherein the condition includes a first condition that sampling points belonging to the same rank are not dominated each other, and a second condition that a sampling point belonging to a certain rank is not dominated by another sampling point belonging to a rank higher than the certain rank;
    determining, in ascending order from a lowest rank to a highest rank among the plurality of ranks, whether or not a first sampling point belonging to a first rank dominates a second sampling point belonging to a second rank higher than the first rank; and
    upon detecting the first sampling point dominates the second sampling point, carrying out a processing while changing the rank from a rank immediately lower than the first rank to the lowest rank, wherein the processing comprises:
        adding the first sampling point and sampling points included in a first dominating source set of the first sampling point to a second dominating source set of the second sampling point, wherein the first dominating source set includes the sampling points dominating the first sampling point, and the second dominating source set includes sampling points dominating the second sampling point; and
        excluding the first sampling point and the sampling points included in the first dominating source set of the first sampling point from sampling points for which the determining is carried out with respect to the second sampling point.

2. The computer-readable, non-transitory storage medium as set forth in claim 1, wherein the procedure further comprises:
    calculating, for each of the plurality of sampling points, a yield by dividing a value calculated by adding 1 and the number of sampling points included in a dominating source set of the sampling point to be considered, by the number of the plurality of sampling points.

3. The computer-readable, non-transitory storage medium as set forth in claim 1, wherein the classifying comprises:
    sorting, for each of the plural types, the plurality of sampling points in ascending order of the performance item value; and
    assigning a rank to each of the plurality of sampling points according to a highest ranking among rankings set in the sorting to the plural types of the performance item values of the sampling point to be considered.

4. An information processing method, comprising:
    classifying, by using a computer, a plurality of sampling points, each having plural types of performance item values, into a plurality of ranks, based on the performance item values, so as to satisfy a condition, wherein the condition includes a first condition that sampling points belonging to the same rank are not dominated each other, and a second condition that a sampling point belonging to a certain rank is not dominated by another sampling point belonging to a rank higher than the certain rank;
    determining, by using the computer, in ascending order from a lowest rank to a highest rank among the plurality of ranks, whether or not a first sampling point belonging to a first rank dominates a second sampling point belonging to a second rank higher than the first rank; and
    upon detecting the first sampling point dominates the second sampling point, carrying out, by using the computer, a processing while changing the rank from a rank immediately lower than the first rank to the lowest rank, wherein the processing comprises:
        adding the first sampling point and sampling points included in a first dominating source set of the first sampling point to a second dominating source set of the second sampling point, wherein the first dominating source set includes the sampling points dominating the first sampling point, and the second dominating source set includes sampling points dominating the second sampling point; and
        excluding the first sampling point and the sampling points included in the first dominating source set of the first sampling point from sampling points for which the determining is carried out with respect to the second sampling point.

5. An information processing apparatus, comprising:
    a memory; and
    a processor configured to execute a procedure, comprising:
    classifying a plurality of sampling points, each having plural types of performance item values, into a plurality of ranks, based on the performance item values, so as to satisfy a condition, wherein the condition includes a first condition that sampling points belonging to the same rank are not dominated each other, and a second condition that a sampling point belonging to a certain rank is not dominated by another sampling point belonging to a rank higher than the certain rank, and data concerning the plurality of sampling points is stored in the memory;
    determining, in ascending order from a lowest rank to a highest rank among the plurality of ranks, whether or not a first sampling point belonging to a first rank dominates a second sampling point belonging to a second rank higher than the first rank; and
    upon detecting the first sampling point dominates the second sampling point, carrying out a processing while changing the rank from a rank immediately lower than the first rank to the lowest rank, wherein the processing comprises:

adding the first sampling point and sampling points included in a first dominating source set of the first sampling point to a second dominating source set of the second sampling point, wherein the first dominating source set includes the sampling points dominating the first sampling point, and the second dominating source set includes sampling points dominating the second sampling point; and excluding the first sampling point and the sampling points included in the first dominating source set of the first sampling point from sampling points for which the determining is carried out with respect to the second sampling point.

* * * * *